United States Patent [19]

Di Modica

[11] Patent Number: 4,761,067

[45] Date of Patent: Aug. 2, 1988

[54] MODULAR MIRROR ON CLAY SUPPORT

[76] Inventor: Vicenzo R. Di Modica, Via Gramsci, 66, 95030 Gravina di Catania, Italy

[21] Appl. No.: 889,550

[22] Filed: Jul. 25, 1986

[30] Foreign Application Priority Data

Jul. 15, 1986 [EP] European Pat. Off. ........ 86830203.5

[51] Int. Cl.[4] ........................ G02B 7/18; B32B 17/00; B32B 18/00

[52] U.S. Cl. .................................... 350/641; 350/590; 350/613; 428/49; 428/78; 428/79; 428/912.2; 248/634

[58] Field of Search ............... 350/641, 642, 613, 616, 350/609, 612, 600, 590, 589; 248/633, 634, 549; 428/49, 78, 79, 912.2, 446, 484–486

[56] References Cited

U.S. PATENT DOCUMENTS

| | | | |
|---|---|---|---|
| 2,162,590 | 6/1939 | Richter et al. | 350/613 |
| 2,294,940 | 9/1942 | Skolnik | 350/641 |
| 2,677,990 | 5/1954 | Bienenfeld et al. | 350/613 |
| 2,988,456 | 6/1961 | Fairbanks et al. | 350/609 |

FOREIGN PATENT DOCUMENTS

| | | | |
|---|---|---|---|
| 1241057 | 8/1960 | France | 350/642 |
| 156584 | of 1983 | Japan | 350/164 |
| 1231234 | 5/1971 | United Kingdom | 350/641 |

*Primary Examiner*—Jon W. Henry
*Attorney, Agent, or Firm*—Beveridge, DeGrandi & Weilacher

[57] ABSTRACT

A modular mirror having any shape for walls or the like includes tiles having a clay support covered by a specular layer having a slightly greater perimeter to allow the perimetrical distribution of a silicon or wax gasket thereabout to protect the side edges of the tile from oxidation. The resulting mirror is installed in the same plane as that of conventional tiles on the wall since the specular tiles have the same perimeter and caliber as conventional tiles.

8 Claims, 1 Drawing Sheet

MODULAR MIRROR ON CLAY SUPPORT

BACKGROUND OF THE INVENTION

The present invention concerns a modular mirror on a clay support to provide an ornamental tile that may be mounted to a wall without need for a continuity solution or grouting. The tile of the present invention can be used with conventional tiles.

It is well known that a mirror provides ornamentation for the finished walls in a bathroom or in the other rooms of a house, a shop or the like.

SUMMARY OF THE INVENTION

It is the object of the present invention to provide a specular or reflective wall portion by means of modular elements or tiles having the same calibre and the same perimeter as tiles conventionally used for covering the wall surface of bathrooms and other rooms.

The present invention provides a new, inexpensive and easy way of providing and/or extending functional specular surfaces.

The objective is achieved by means of a modular mirror according to the present invention. The modular mirror according to the present invention comprises square and rectangular tiles with ceramic clay supports having a thickness of between 1 and 20 mm, covered with specular or reflective layers of a thickness between 1 and 10 mm, to result in tiles having a perimeter and calibre (in an exact parallelism to the surfaces) identical to conventional covering tiles and thus are set by the same process, to implement regular and irregular geometrical structures with the only difference, with respect to the wall, of being specular.

BRIEF DESCRIPTION OF THE DRAWINGS

The present invention will be described in detail hereinbelow with respect to the attached drawings showing preferred embodiments of the invention.

DETAILED DESCRIPTION OF THE PREFERRED EMBODIMENTS

Figure 2:
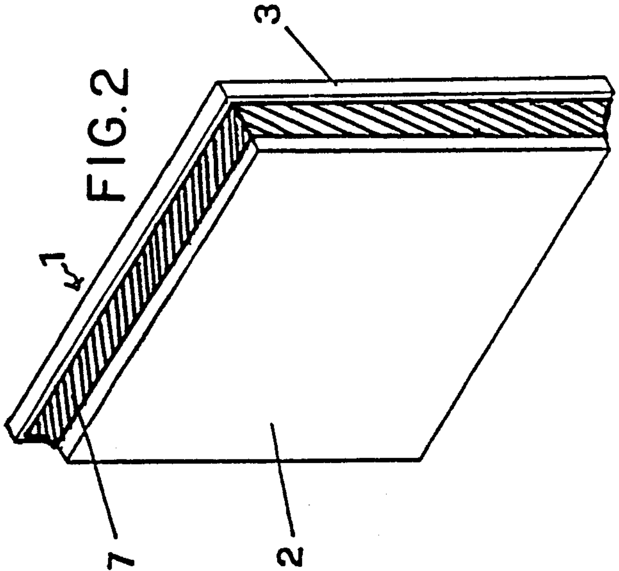
FIGS. 1 and 2 respectively are perspective front and back views of a square-shaped modular mirror according to the present invention.
Figure 4:
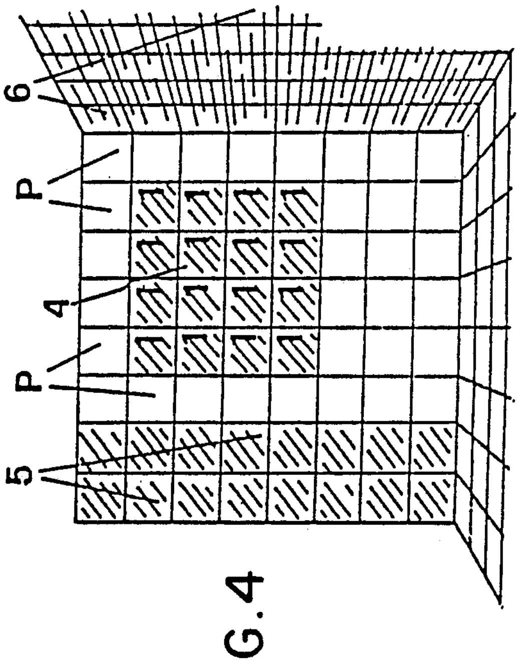
FIG. 4 is a perspective view of a wall covered with different modular mirror structures according to the present invention.
Figure 1:
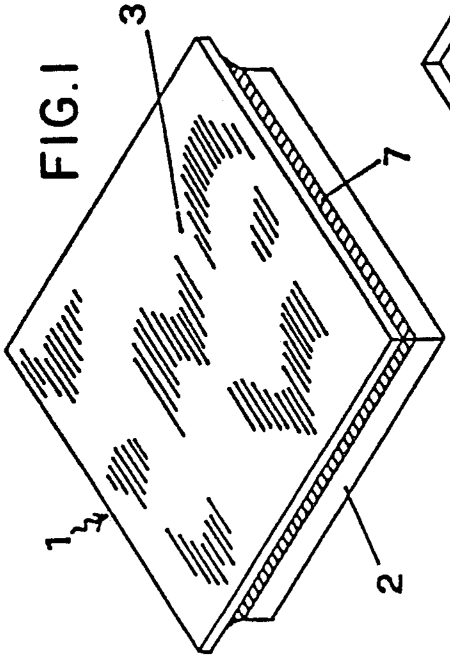

The present invention concerns a modular mirror comprising square or rectangular tiles 1, including a ceramic clay support 2, having a thickness between 1 and 20 mm, covered by a specular layer 3 of a thickness between 1 and 10 mm. The tiles are adapted to be placed one beside the other, without need for continuity solution or grouting, with the finishing tiles P of the walls to provide square and/or rectangular mirror surfaces 4 and/or 5 with their major axis being horizontal or vertical, and/or complete reflective walls.

It is a further feature of the present invention that the ceramic support 2 has a smaller surface than the specular surface 3 to provide for placement of the silicon or wax gasket 7 around the perimeter of the reflective tile to protect the lateral surface of the specular layer, namely to prevent oxidation, which until now was the main disadvantage of mirrors. The perfect cut of the specular layer allows the placement of the tiles without continuity solution (grouting).

A further feature of the present invention is that the placing and the setting of the tiles 1 with a specular surface are preferably on the same plane as the one for the finishing tiles P on the wall, without any extroflection or hollowing, since the tiles 1 have the same perimeter and the same calibre as the conventional finishing tiles.

Figure 3:
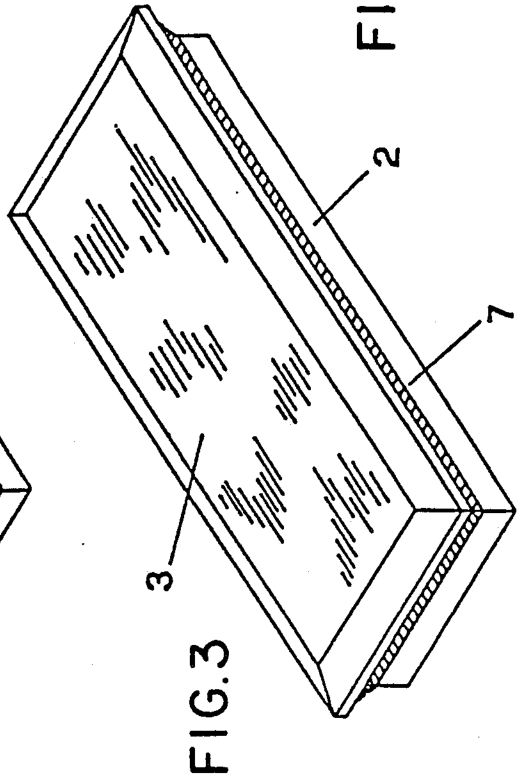
FIG. 3 is a perspective view of another embodiment having a rectangular shape and a ground specular surface.

In the embodiment of FIG. 3, the specular layer 3 is replaced by a colored glass layer supplied to the ceramic clay support 2 to provide a result different from conventional glass tiles and to maintain a considerable reflective feature.

The main advantages of the tiles of the present invention are that they:

are quick and easy to install;

are as easy to transport as conventional tiles;

require the same storage space as conventional tiles;

lack breaking points in the resulting specular surface, the same result is obtained in the combination of a plurality of separately set tiles;

are adapted to implement simple or ground specular surfaces having any shape.

In summary, the modular mirror according to the present invention on a clay support that may be inserted, without continuity solution, in the plane of a wall includes square or rectangular tiles (1) on a clay support (2) having a thickness between 1 and 20 mm, covered with a specular layer (3) having a thickness between 1 and 10 mm that may be combined without continuity solution with the finishing tiles (P) of the wall to implement reflective surfaces.

The modular mirror is further characterized in that the tiles (1) are set side by side to implement the specular surfaces.

The modular mirror is also characterized in that the tiles (1) are set side by side to implement a complete specular surface wall (6).

The modular mirror is further characterized by consisting of tiles (1) provided with a ceramic support (2) having a smaller surface with respect to the specular surface layer (3) to allow the perimetral distribution of a silicon or wax gasket to protect the lateral cut of the specular surface.

The modular mirror is still further characterized in that combining and setting of the tiles (1) having a specular surface is carried out on the same plane as the finishing tiles (P) of the walls, without any extroflection or hollowing, due to the tiles (1) having the same perimeter and the same calibre as the finishing tiles.

The modular mirror is yet further characterized in that the specular layer (3) may be replaced by a coloured glass layer, also applied to the ceramic clay support (2) to provide a result different from conventional glass tiles and a reflective feature.

I claim:

1. A reflective tile having a top ornamental surface, a bottom surface and a plurality of sides and being mountable to a wall, said tile comprising:

a base portion formed from a clay ceramic material to have a thickness of from 1 mm to 20 mm for providing said bottom surface, said base portion having a plurality of substantially flat sides defining a first perimeter for said base portion, and a reflective portion disposed on said base portion for providing said ornamental surface, said reflective portion having a thickness of from 1 mm to 10 mm and a corresponding plurality of substantially flat sides defining a second perimeter larger than said first perimeter, said sides of said reflective portion and said base portion defining said sides of said tile.

2. A reflective tile as claimed in claim 1, further comprising a silicon gasket extending around said sides of said tile, said gasket bridging a portion of said sides of said base portion and a portion of said sides of said reflective portion.

3. A reflective tile as claimed in claim 1, further comprising a wax gasket extending around said sides of said tile, said gasket bridging a portion of said sides of said base portion and a portion of said sides of said reflective portion.

4. A reflective tile as claimed in claim 1, wherein said reflective portion comprises a colored glass.

5. An arrangement of tiles for adorning a wall, said arrangement comprising at least one tile having a top ornamental surface, a bottom surface and a plurality of sides, said at least one tile including a base portion formed from a clay ceramic material to have a thickness from 1 mm to 20 mm for providing said bottom surface and having a plurality of substantially flat sides defining a first perimeter, and a reflective portion disposed on said base portion for providing said ornamental surface, said reflective portion having a thickness of from 1 mm to 10 mm and a corresponding plurality of substantially flat sides defining a second perimeter larger than said first perimeter, said sides of said reflective portion and said base portion defining said sides of said tile.

6. An arrangement as claimed in claim 5, wherein at least two of said reflective tiles are mounted adjacent each other on a wall.

7. An arrangement as claimed in claim 5, further comprising conventional tiles, said reflective tiles having substantially the same thickness as the conventional tiles and said reflective portions having substantially the same perimeter as the conventional tiles.

8. An arrangement as claimed in claim 5, comprising a plurality of adjacent reflective tiles mounted on a wall in side-by-side relationship without material therebetween.

* * * * *